United States Patent
Tobitsuka et al.

(10) Patent No.: US 6,683,751 B2
(45) Date of Patent: Jan. 27, 2004

(54) MAGNETIC HEAD UNIT

(75) Inventors: Hiroaki Tobitsuka, Yamagata (JP); Koichi Hosoya, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 309 days.

(21) Appl. No.: 09/954,272

(22) Filed: Sep. 18, 2001

(65) Prior Publication Data

US 2002/0041466 A1 Apr. 11, 2002

(30) Foreign Application Priority Data

Sep. 22, 2000 (JP) .................................... P.2000-287900

(51) Int. Cl.⁷ ................................................. G11B 5/10
(52) U.S. Cl. ....................................................... 360/129
(58) Field of Search ................. 360/129, 125, 360/122

(56) References Cited

U.S. PATENT DOCUMENTS 4,044,392 A * 8/1977 Brock et al. ................. 360/316
6,084,747 A * 7/2000 Takahashi .................... 369/253

* cited by examiner

*Primary Examiner*—George J. Letscher
(74) *Attorney, Agent, or Firm*—Whitham, Curtis & Christofferson, P.C.

(57) ABSTRACT

A plurality of magnetic head elements, each having a terminal portion, are arranged on a first face of the head chip. A wiring board member is electrically connected to the respective terminal portions of the magnetic head elements. A pair of side chips sandwich the head chip from both sides of the first face. Each of the side chips has faces forming a recessed portion which faces with at least the terminal portions of the magnetic head elements.

4 Claims, 4 Drawing Sheets

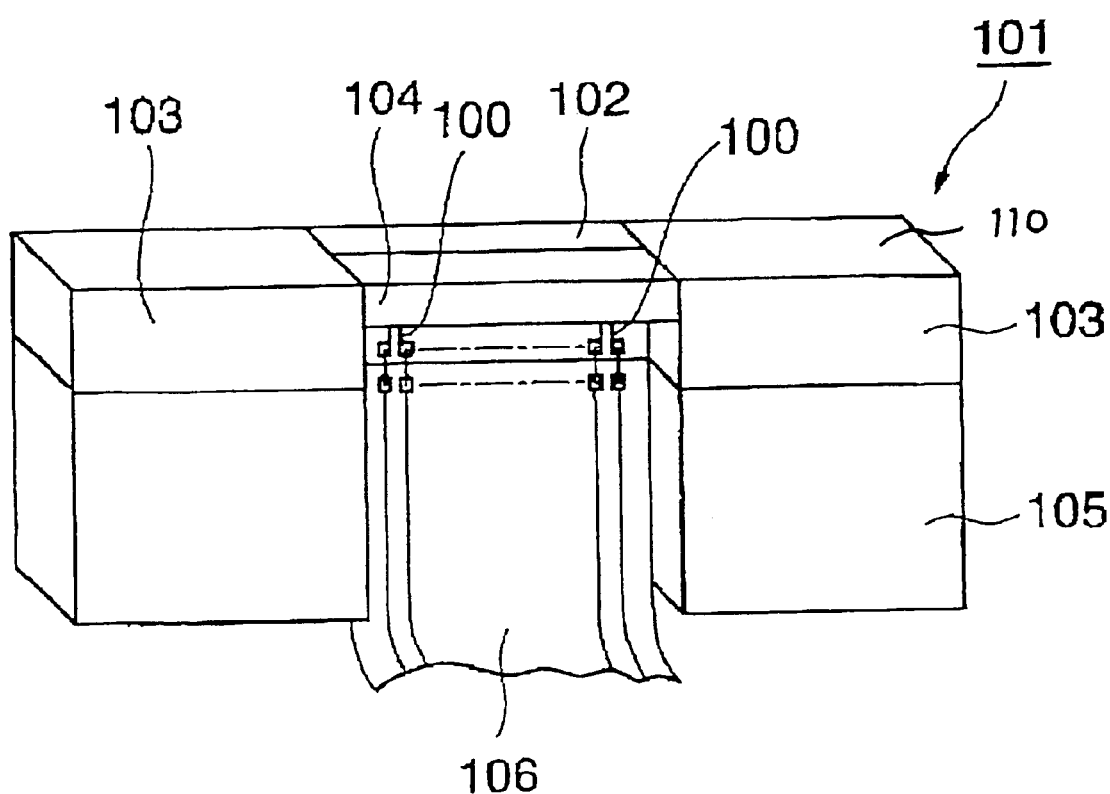

MAGNETIC HEAD UNIT

BACKGROUND OF THE INVENTION

The present invention relates to a magnetic head unit in which a head chip having a plurality of magnetic head elements electrically coupled to a flexible wiring board is sandwiched by a pair of side chips.

FIG. 7 shows a related magnetic head unit 101 for recording a plurality of recording tracks a magnetic tape and reproducing them. The magnetic head unit 101 is provided with a head chip 102 having a plurality of magnetic head elements 100, a pair of side chips 103 sandwiching the head chip 102 from both sides thereof, a protection chip 104 sandwiched by the side chips 103 together with the head chip 102, and a base 105 on which the head chip 102 and the side chips 103 are mounted.

The plural magnetic head elements 100 are arranged on a side face of the head chip 102 which opposes to the protection chip 104 while facing magnetic gaps thereof to a main face 110 defined by the protection chip 104 and the pair of the side chips. The terminal portions of the plural magnetic head elements 100 are placed at an exposed portion in a state where the protection chip 104 is disposed. The terminal portions of the plural magnetic head elements 100 are electrically coupled to a flexible wiring board 106.

The magnetic head unit 101 is configured by abutting the head chip 102, the pair of the side chips 103 and the protection chip 104 with each other. The main face 110 is rounded so as to serve as a sliding face on which a magnetic tape is slid.

In the magnetic head unit 101 configured in this manner, the plural magnetic head elements 100 record and reproduce a signal on and from a magnetic tape which slides on the sliding face. In this case, the plural magnetic head elements 100 are coupled to a magnetic recording and reproducing circuit through the flexible wiring board 106, whereby a desired signal can be recorded and a signal written on the magnetic tape can be reproduced.

However, in the magnetic head unit 101 thus configured, the flexible wiring board 106 is coupled to the plural magnetic head elements 100 by wire bonding etc. That is, after the head chip 102, the pair of the side chips 103, the protection chip 104 and the base 105 are combined, the flexible wiring board 106 is coupled to the terminal portions of the magnetic head elements 100 exposed downward of the protection chip 104 by the wire bonding.

However, in the related magnetic head unit 101, at the time of wire-bonding the flexible wiring board 106, there arises a problem that the workability is not good since the both end portions of the flexible wiring board 106 are close to the pair of the side chips 103. In this case, since the flexible wiring board 106 may not be coupled surely to the plural magnetic head elements 100, the magnetic head unit 101 may not be good in its reliability.

Further, in the related magnetic head unit 101, it is considered that the head chip 102 is formed to be expanded in its both side directions and to make the distance between the pair of the side chips 103 and the flexible wiring board 106 larger so that the wire-bonding operation of the flexible wiring board 106 can be performed easily. However, when the head chip 102 is made larger in this manner, the number of the chips 102 formed from a single substrate is inevitably reduced and so there arises a problem that the productivity is reduced.

In other words, in the related technique, there was a problem that the magnetic head unit 101 excellent in its reliability can not be fabricated by using the head chip 102 with a size as small as possible. That is, there was a problem that it is impossible to obtain a magnetic head unit which realizes both the reliability and the productivity.

SUMMARY OF THE INVENTION

Accordingly, an object of the invention is to provide a magnetic head unit which is excellent in reliability and productivity.

In order to achieve the above object, according to the present invention, there is provided a magnetic head unit, comprising:

a head chip, provided with a first face;

a plurality of magnetic head elements arranged on the first face of the head chip, each having a terminal portion;

a wiring board member, electrically connected to the respective terminal portions of the magnetic head elements; and a pair of side chips, for sandwiching the head chip from both sides of the first face thereof, each having faces forming a recessed portion which faces with at least the terminal portions of the magnetic head elements.

In this configuration, since the recessed portion is formed at a portion of each of the side chips which faces to the terminal portions of the magnetic head elements, there can be obtained spaces for connecting the wiring board member to the terminal portions by wire bonding, for example. Accordingly, even if a head chip having a relatively small size is used, the wire bonding procedure can be easily performed without being interfered by the side chips. Therefore, there can be obtained a magnetic head unit excellent in both of connection reliability and productivity.

Preferably, the magnetic head unit further comprises a base member formed with a groove in which the wiring board member is disposed.

Here, it is preferable that faces forming the groove are made flush with the faces forming the respective recessed portions of the side chips.

In this configuration, since the faces forming the groove and the recessed portions are made excellent in mechanical strength, the magnetic head unit can prevent the occurrence of the breakage due to unexpected impact etc.

Further, it is preferable that a bottom portion of the groove has a width as same as a width of the wiring board member.

In this configuration, the wiring board member can be positioned along the groove quite accurately.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIG. 7 is a perspective view showing a related magnetic head unit.

DETAILED DESCRIPTION OF THE PREFERRED EMBODIMENTS

The preferred embodiments of the magnetic head unit according to the invention will be explained in detail with reference to the accompanying drawings.

Figure 1:
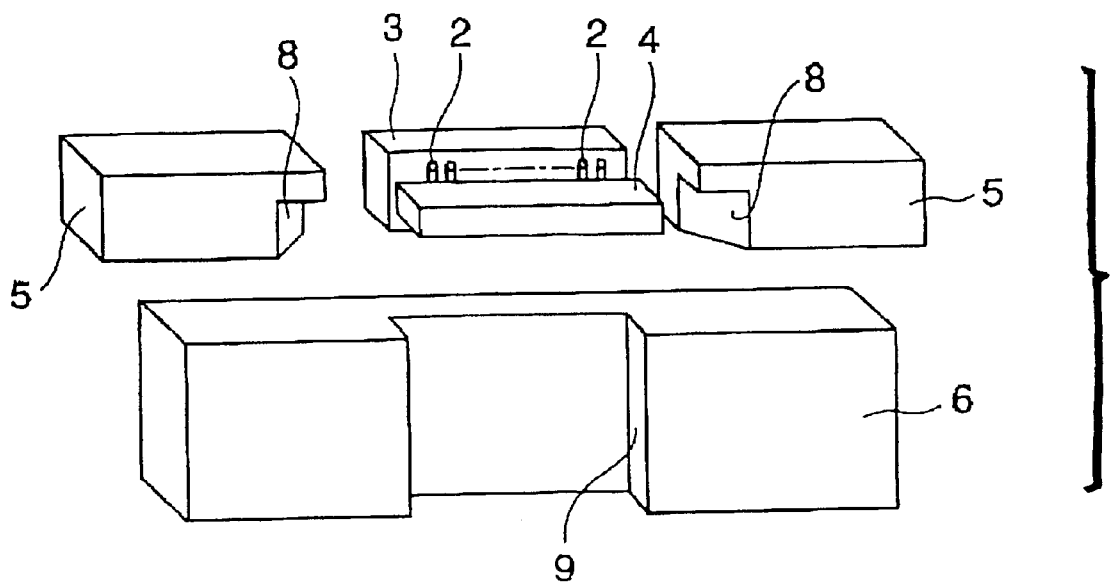
FIG. 1 is an exploded perspective view of a magnetic head unit according to a first embodiment of the invention.
Figure 2:
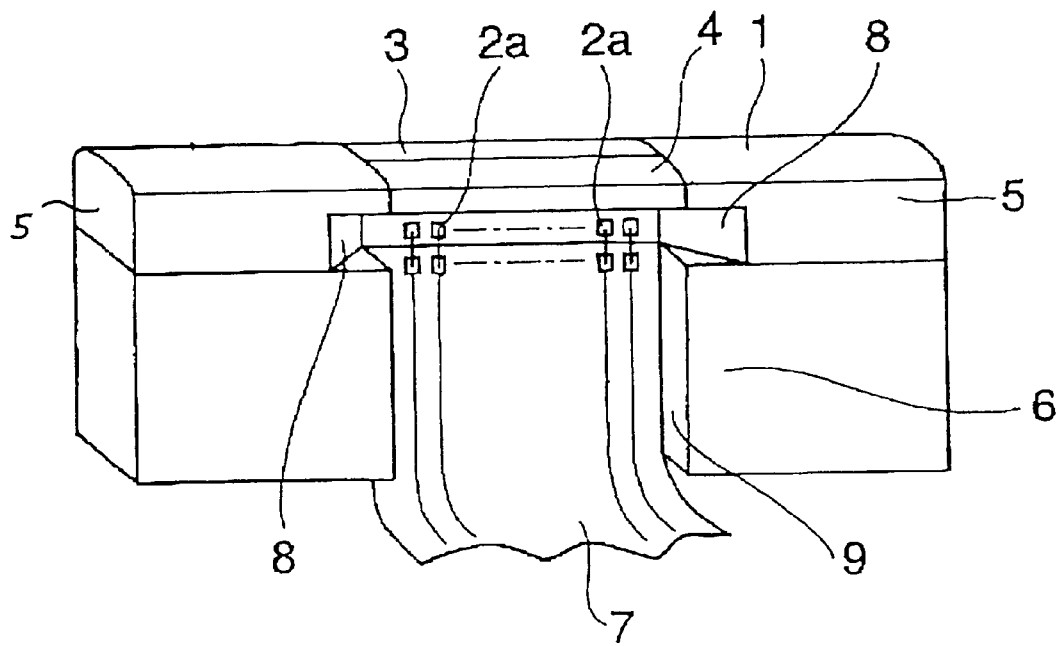
FIG. 2 is a perspective view of the magnetic head unit of FIG. 1.

The magnetic head unit according to a first embodiment is arranged in a manner as shown in FIGS. 1 and 2 that magnetic gaps of a plurality of magnetic head elements 2 are respectively faced with a sliding face 1 on which a magnetic tape slides. The magnetic head elements 2 record and reproduce a signal on and from the magnetic tape. The magnetic head unit is configured by a head chip 3 having the plural magnetic head elements 2 on its one side face, a protection chip 4 disposed so as to oppose to the one side face of the head chip 3, a pair of side chips 5 disposed so as to sandwich the head chip 3 and the protection chip 4, a base 6 on which the head chip 3 and the pair of the side chips 5 are mounted, and a flexible wiring board 7 coupled to the terminal portions of the plural magnetic head elements 2.

In the magnetic head unit, the plural magnetic head elements 2 are arranged on a ceramic substrate while having a reproducing portion and a recording portion respectively. The reproducing portion is configured by forming a film of a magnetoresistive element, for example. The recording portion is configured by an electromagnetic induction type element formed by the spattering method and the etching method etc. In this respect, the head chip 3 is configured in a manner that the plural magnetic head elements 2 are simultaneously formed on a ceramic wafer and thereafter the ceramic wafer is cut into pieces of predetermined shapes to form the head chip 3.

The protection chip 4 is configured to have such a shape sufficient for covering an area except for the terminal portions 2a of the magnetic head elements 2 in a state where the protection chip is disposed to oppose to the one side face of the head chip 3 on which the magnetic head elements 2 are arranged.

The pair of the side chips 5 are provided with recessed portions 8 on their faces sandwiching the head chip 3, respectively. Each of the recessed portions 8 extends to the face abutting against the base 6 in a manner that the main face forming the sliding face 1 is remained. In other words, the pair of the side chips 5 are provided with the recessed portions 8 at portions sandwiching the terminal portions 2a of the magnetic head elements 2.

The base 6 is provided with a groove 9 having a width corresponding to the width of the flexible wiring board 7. Thus, the flexible wiring board 7 can be accurately positioned within the groove 9 of the base 6.

At the time of fabricating the magnetic head unit configured in this manner, the head chip 3, the protection chip 4, the pair of the side chips 5 and the base 6 are assembled and the sliding face 1 is rounded, and thereafter the flexible wiring board 7 is disposed along a groove 9 formed in the base 6. In this case, since the groove 9 has a width corresponding to the width of the flexible wiring board 7, the flexible wiring board 7 can be positioned quite accurately. Then, the flexible wiring board 7 is coupled to the terminal portions 2a of the magnetic head elements 2 by wire bonding in a state where the flexible wiring board 7 is positioned.

In this case, since the recessed portion 8 is formed at portions sandwiching the terminal portions 2a of the magnetic head elements 2, the wire bonding can be performed easily even for the terminal portions 2a of the magnetic head elements 2 positioned closest to the side chip 5 side. That is, the flexible wiring board 7 can be easily coupled over the entire width thereof without being interfered by the side chips 5.

In other words, in the magnetic head unit, even if a number of the magnetic head elements 2 are arranged on the head chip 3, the flexible wiring board 7 can be surely coupled without being interfered by the side chips 5. Thus, it is not necessary to make the width of the head chip 3 larger, so that many head chips can be cut out from a predetermined ceramic wafer. That is, the magnetic head unit is excellent in productivity.

Figure 3:
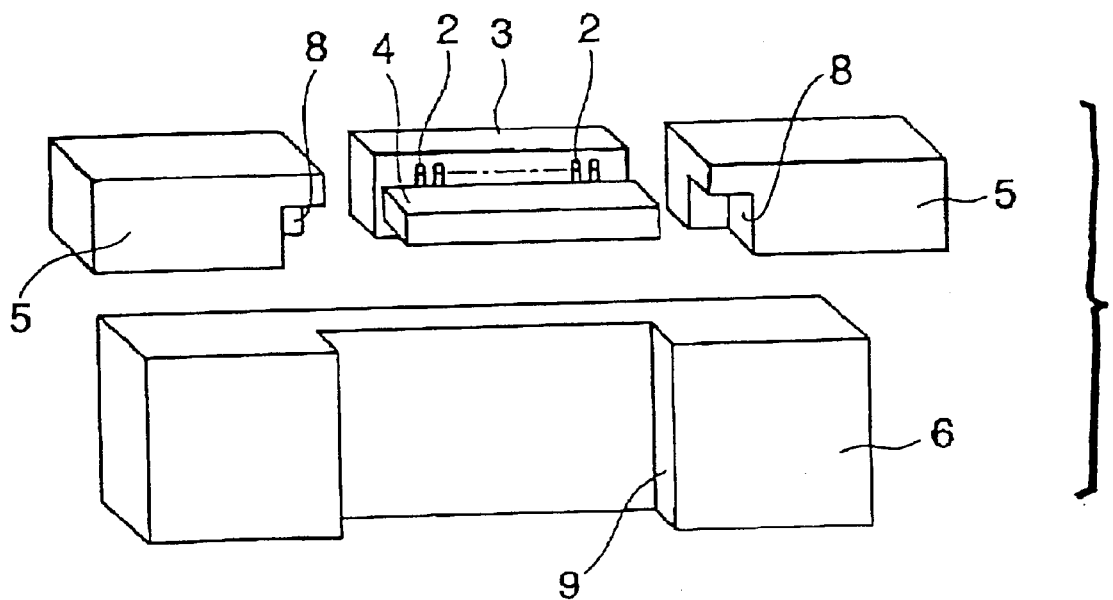
FIG. 3 is an exploded perspective view of a magnetic head unit according to a second embodiment of the invention.
Figure 4:
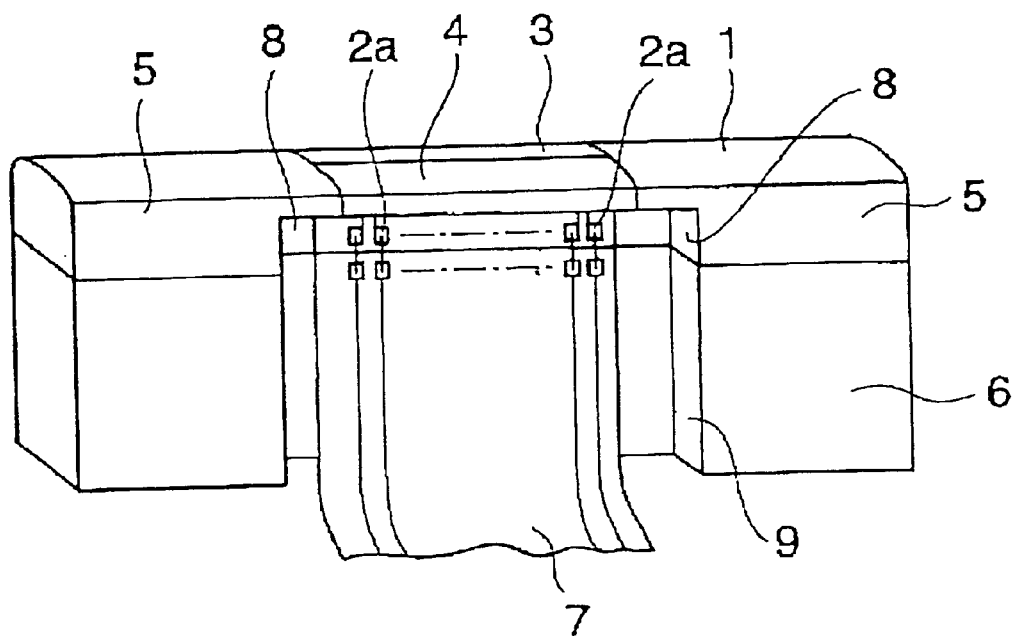
FIG. 4 is a perspective view of the magnetic head unit of FIG. 3.

FIGS. 3 and 4 show a magnetic head unit according to a second embodiment of the invention. In this embodiment, faces forming recessed portions 8 are respectively made flush with associated faces of a groove 9. Also in this case, since the recessed portion 8 is formed at each of the pair of the side chips 5, the wire bonding can be performed easily even for the terminal portions 2a of magnetic head elements 2 positioned closest to the side chip 5 side.

Further, since the both side wall faces constituting the groove 9 are made flush with the associated faces of the recessed portions 8, respectively, the both side wall faces are excellent in mechanical strength. Thus, the magnetic head unit can prevent the occurrence of the breakage due to unexpected impact etc.

Figure 5:
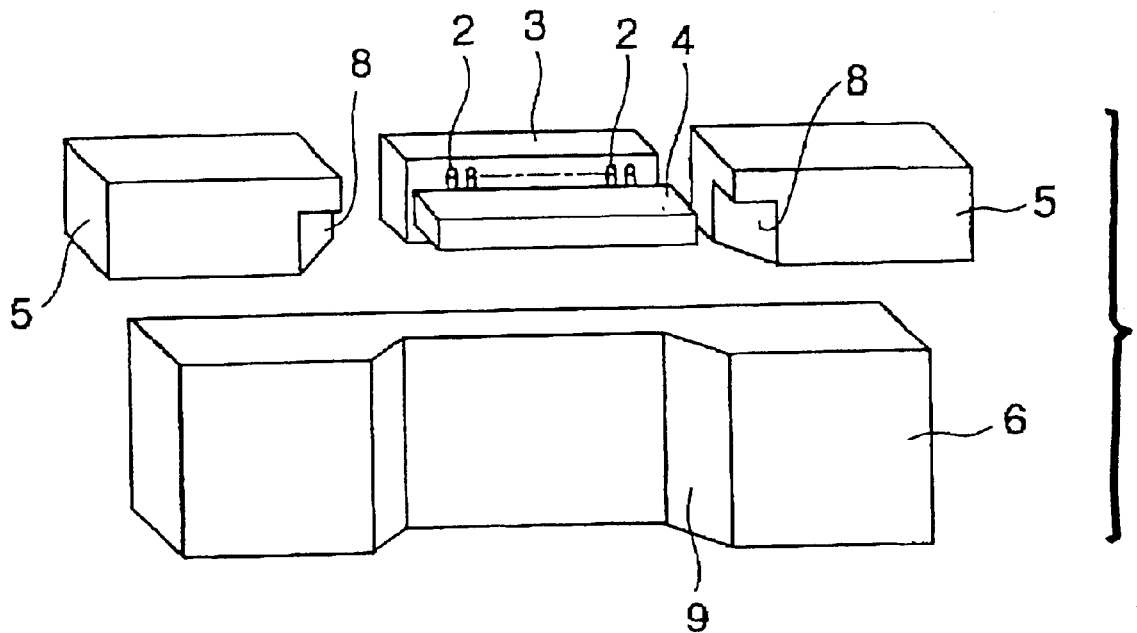
FIG. 5 is an exploded perspective view of a magnetic head unit according to a third embodiment of the invention.
Figure 6:
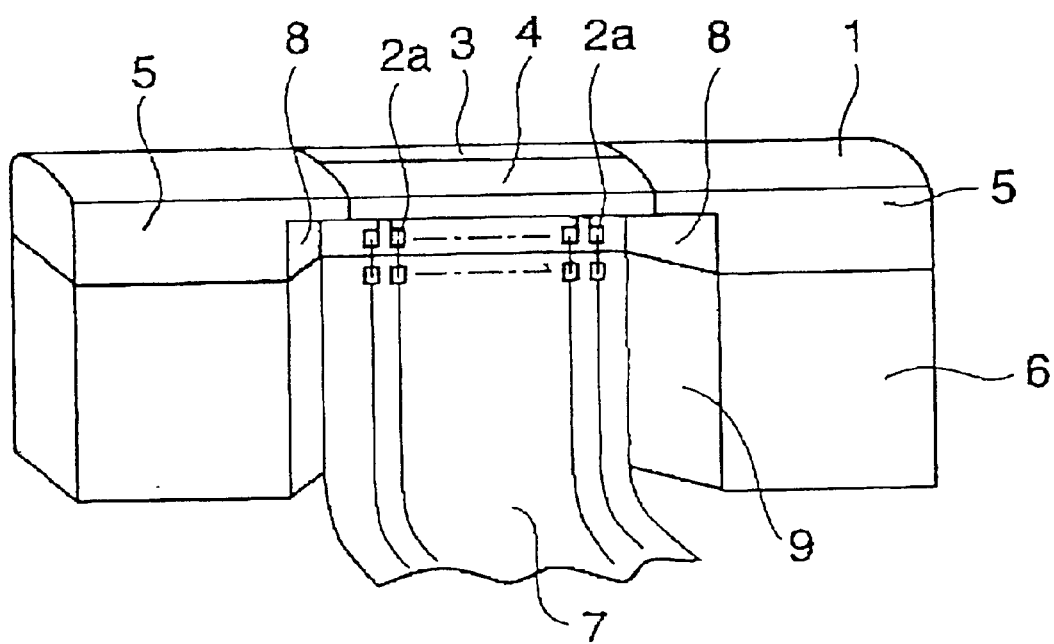
FIG. 6 is a perspective view of the magnetic head unit of FIG. 5.

FIGS. 5 and 6 show a magnetic head unit according to a third embodiment of the invention. In this embodiment, side wall faces of a groove 9 formed at a base 6 is tapered so as to define a bottom having a width as same as the width of the flexible wiring board 7, while being made flush with the associated faces of recessed portions 8 formed at side chips 5. In this case, the flexible wiring board 7 can be positioned along the groove 9 quite accurately. Further, since the both side wall faces constituting the groove 9 are made flush with the associated faces of the recessed portions 8, respectively, the both side wall faces are excellent in mechanical strength.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A magnetic head unit, comprising:
    a head chip, provided with a first face;
    a plurality of magnetic head elements arranged on the first face of the head chip, each having a terminal portion;
    a wiring board member, electrically connected to the respective terminal portions of the magnetic head elements; and
    a pair of side chips, for sandwiching the head chip from both sides of the first face thereof, each having faces forming a recessed portion which faces with at least the terminal portions of the magnetic head elements.

2. The magnetic head unit as set forth in claim 1, further comprising a base member formed with a groove in which the wiring board member is disposed.

3. The magnetic head unit as set forth in claim 2, wherein faces forming the groove are made flush with the faces forming the respective recessed portions of the side chips.

4. The magnetic head unit as set forth in claim 2, wherein a bottom portion of the groove has a width as same as a width of the wiring board member.

* * * * *